Patented July 18, 1950

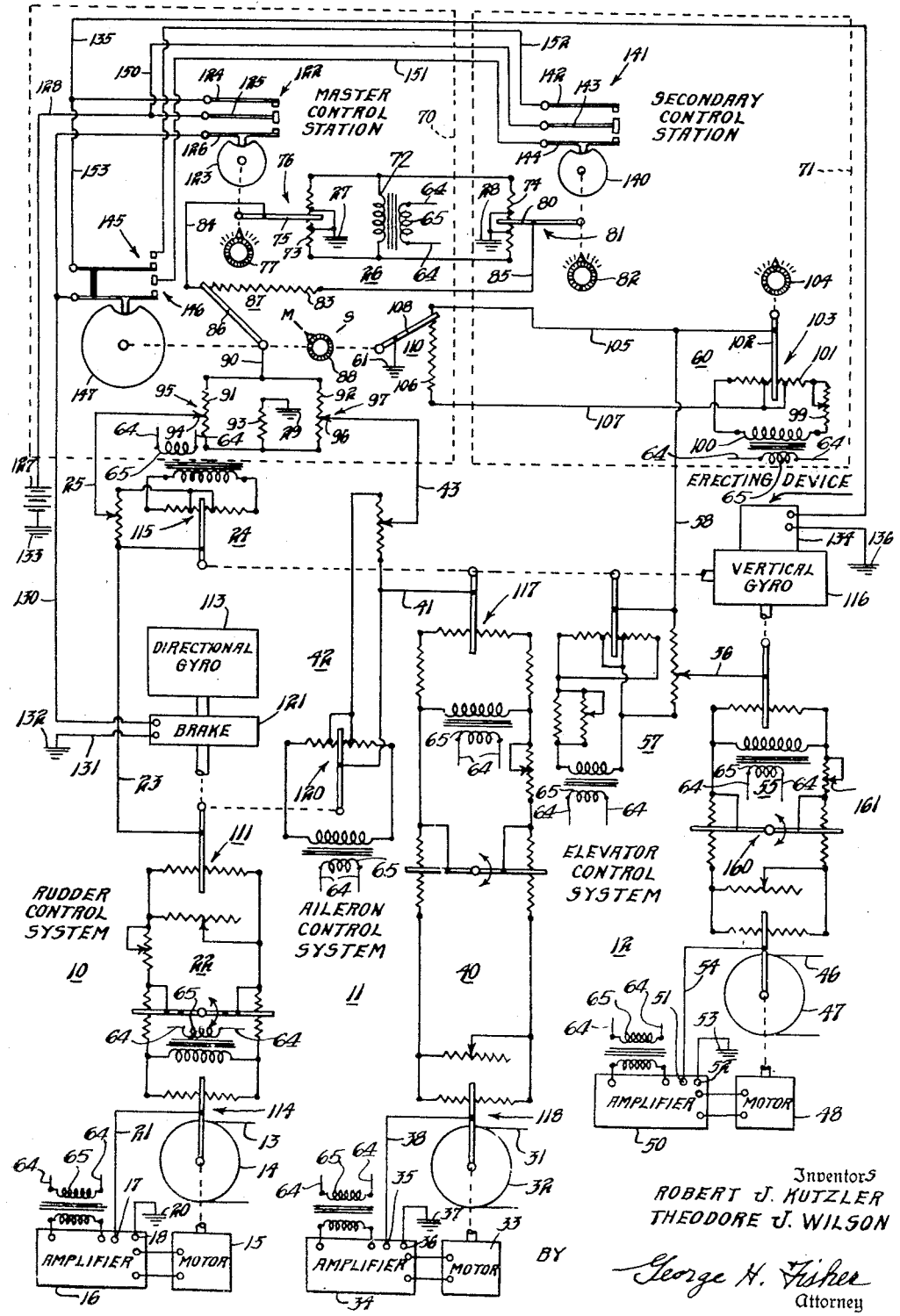

2,515,349

UNITED STATES PATENT OFFICE 2,515,349

CONTROL APPARATUS

Robert J. Kutzler and Theodore J. Wilson, Minneapolis, Minn., assignors to Minneapolis-Honeywell Regulator Company, Minneapolis, Minn., a corporation of Delaware Application December 21, 1942, Serial No. 469,626

18 Claims. (Cl. 318—489)

The present invention relates to control apparatus, and more particularly to control apparatus in which a controlled device may be selectively controlled manually or automatically.

An object of the present invention is to provide improved control apparatus of the type wherein a plurality of controlled devices are simultaneously controlled from a remotely located control station.

Another object of the present invention is to provide improved control apparatus wherein a controlled device is controllable from a plurality of remotely located control stations. A further object is to provide, in such control apparatus, improved means whereby the operator at one of the remotely located stations may selectively determine which one of the control stations is to be in command of the controlled device.

A further object of the present invention is to provide an improved system for operating the control surfaces of an aircraft, of the type described in the co-pending application of Willis H. Gille, Serial No. 447,989, filed June 22, 1942.

Another object is to provide, in a system for operating the control surfaces of an aircraft, improved means whereby the pilot may, by operating a single control device, simultaneously control both the rudder and ailerons so as to make a properly banked turn. Another object is to provide, in such a control system, means whereby the pilot may transfer control of the rudder and ailerons to another member of the crew of the aircraft, for example, a navigator or bombardier.

Other objects and advantages of the present invention will become apparent from a consideration of the accompanying specification, claims, and drawings, in which The single figure represents, somewhat diagrammatically, a system for operating the control surfaces of an aircraft in accordance with the principles of our invention.

Referring to the drawing, there are shown a rudder control system generally indicated at 10, an aileron control system 11, and an elevator control system 12.

Considering first the rudder control system 10, the rudder, which does not appear in the drawing, is operated by a cable 13, which passes over a pulley 14 driven by a motor 15. The motor 15 is controlled by an amplifier 16 having a pair of signal input terminals 17 and 18. The signal input terminal 18 is connected to ground at 20. The signal input terminal 17 is connected to ground through a connection which may be traced from terminal 17 through a conductor 21, a main rudder control network 22, a conductor 23, a compensating rudder control network 24, a conductor 25 and a manual control network 26 to one or more of ground connections 27, 28 and 29 located in the manual control network. Each of the control networks 22, 24 and 26 may introduce into the connection just traced a signal potential. The amplifier 16 responds to the algebraic sum of such potentials and controls the operation of motor 15, and hence of the rudder, in accordance with the phase and amplitude of such vector sum.

Referring to the aileron control system 11, the ailerons, not shown in the drawing, are operated by a cable 31 which passes over a pulley 32 driven by a motor 33. The motor 33 is controlled by an amplifier 34 having input terminals 35 and 36. The input terminal 36 is connected to ground at 37. The input terminal 35 is connected to ground through a connection which may be traced from terminal 35, through a conductor 38, a main aileron control network 40, a conductor 41, a compensating aileron control network 42, a conductor 43, and the manual control network 26 to one or more of the ground connections 27, 28, and 29 located in the manual control network.

Referring to the elevator control system 12, the elevator, not shown in the drawing, is driven by a cable 46 which passes over a pulley 47 driven by a motor 48. The motor 48 is controlled by an amplifier 50 having signal input terminals 51 and 52. The signal input terminal 52 is connected to ground at 53. The signal input terminal 51 is connected to ground through a connection which may be traced from terminal 51 through a conductor 54, a main elevator control network 55, a conductor 56, a compensating elevator control network 57, and a manual control network 60, to ground connection 61 which is located in the manual control network 60.

The main and compensating control networks, and the motor and amplifier circuits are described in detail in the co-pending Gille application previously referred to, and therefore will be described only briefly in the present application. The present invention is concerned more with the manual control networks 26 and 60, and with the cooperation of these manual control networks with the other parts of the system.

The various circuit elements in the manual control networks 26 and 60 are located in part in a master control station shown in the drawing within a dotted line 70 and a secondary control station shown in the drawing within a dotted line 71. In practice, the master control station 70 ordinarily is located in the pilot's compartment of the aircraft, and the secondary control station 71 is located, for example, in the bombardier's or navigator's compartment.

The manual control network 26 is supplied with electrical energy from a transformer secondary winding 72. A slidewire resistance 73 located at the master control station 70, and a slidewire resistance 74, located at the secondary control station 71, are connected in parallel across the terminals of secondary winding 72. Spaced taps adjacent the center of resistance 73 are connected to ground at 27, so that a dead spot constantly at ground potential is provided at the center of resistance 73. Similarly, spaced taps adjacent the center of resistance 74 are connected to ground at 28.

A slider 75 cooperates with resistance 73. The resistance 73 and the slider 75 together form a master control potentiometer 76. The slider 75 is movable over resistance 73 by rotation of a manually operable knob 77.

A slider 80 cooperates with resistance 74. The slider 80 and resistance 74 together form a secondary control potentiometer 81. The slider 80 is movable along the resistance 74 by operation of a manually movable knob 82.

The sliders 75 and 80 are connected to the opposite ends of a slidewire resistance 83 by conductors 84 and 85, respectively. A slider 86 cooperates with resistance 83. The resistance 83 and slider 86 together form a transfer potentiometer 87. The slider 86 is movable along the resistance 83 by means of a manually operable knob 88.

The slider 86 is connected through a conductor 90, parallel resistances 91 and 92, and a fixed resistance 93 to ground at 29. A slider 94 is connected to conductor 25, and is movable along resistance 91. The slider 94 and resistance 91 together form a rudder trimmer potentiometer 95. A slider 96 is connected to conductor 43 and is movable along resistance 92. The slider 96 and resistance 92 together form an aileron trimmer potentiometer 97.

Referring to the elevator manual control network 60, it may be seen that this network is supplied with electrical energy from a transformer secondary winding 100. Connected across the terminals of winding 100 is a slidewire resistance 101. A variable resistance 99 is connected between one terminal of winding 100 and the corresponding terminal of slidewire resistance 101, for calibration purposes. A slider 102 is movable along the resistance 101. The slider 102 and resistance 101 together form an elevator control potentiometer 103. The slider 102 is movable along resistance 101 by means of a manually operable knob 104. Slider 102 is connected through a conductor 105 to one terminal of a slidewire resistance 106. The resistance 101 has spaced taps adjacent the center to provide a dead spot, and these spaced taps are connected through a conductor 107 to the other terminal of resistance 106. A slider 108, connected to ground at 61, cooperates with resistance 106. The slider 108 and resistance 106 together form an elevator transfer potentiometer 110. The slider 108 is moved along resistance 106 upon operation of knob 88, simultaneously with the movement of slider 86 of transfer potentiometer 87.

The secondary windings 72 and 100, as well as all the secondary windings in the main and compensating networks, should be supplied with electrical energy from a common source, in order that the various signal potentials may be combined to produce a proper resultant potential. It is often convenient, in actual practice, to have all of the secondary windings energized by a single transformer primary; and we have illustrated this in the drawing by showing all of the transformer primaries, wherever located, as a single primary winding designated by the numeral 65, while leads 64 connect to a source of alternating current. It is to be understood, of course, that separate primaries may be used for each secondary winding if this seems to be desirable.

Consider briefly the operation of the rudder and aileron control systems as if the manual control network 26 were not present. In the rudder control system 10, the signal potential provided by the main control network 22 is determined by the relative positions of a control potentiometer 111, operated by a directional gyroscope 113 in accordance with the deviations of the aircraft from a predetermined course, and a rebalancing potentiometer 114 which is driven concurrently with the pulley 14 by the motor 15. The signal potential provided by the rudder compensating network 24 is determined by the position of a rudder compensating potentiometer 115 operated by a vertical gyroscope 116 in accordance with the tilting of the aircraft about an axis extending through it longitudinally from nose to tail. These two signal potentials are connected in series, so that their vector sum is impressed on the input terminals 17 and 18 of the amplifier 16. The motor 15 is driven in a direction depending upon the phase of the signal applied to the input terminals 17 and 18 of amplifier 16 to drive the rebalancing potentiometer 114 in a direction to reduce the signal applied to input terminals 17 and 18 to zero.

In the aileron control system 11, the signal potential provided by the main control network 40 is determined by the relative positions of an aileron control potentiometer 117, which is driven by the vertical gyro 116 in accordance with the angular position of the aircraft with respect to its longitudinal axis, and a rebalancing potentiometer 118, which is driven by the motor 33 in accordance with the signal potential applied to the input terminals 35 and 36 of amplifier 34. The signal potential provided by the aileron compensating network 42 is determined by the position of an aileron compensating potentiometer 120 which is operated by the directional gyro 113 in accordance with the deviations of the aircraft from its predetermined course.

The rudder and aileron main and compensating control networks cooperate in a manner described in the Gille application referred to above, to maintain the aircraft in its desired course, and to maintain it horizontal with respect to its longitudinal axis.

The purpose of the manual control network 26 is to enable the pilot at the master control station 70, or some other crew member at the secondary control station 71, to manually control the turning of the aircraft at will.

When the slider 85 of transfer potentiometer 87 is in the position shown in the drawing, then the operation of slider 75 along resistance 73 serves to introduce a signal potential into both the rudder and aileron control systems. Under these conditions, the slider 86 is at the same potential as slider 75, since the two sliders are directly connected through conductor 84. The upper terminals of resistances 91 and 92 are therefore connected to ground through conductor 90, slider 86, conductor 84, slider 75, and ground connection 27. The lower terminals of resistances 91 and 92 are connected to ground through resistance 93 and ground connection 29. There is then no potential drop along either resistance 91 or 92, and the sliders 94 and 96 are hence at ground potential. The manual control network 26 then introduces no signal potential into either the rudder or aileron control systems and the rudder and ailerons are under the control of the gyroscopes 113 and 116.

Now let it be assumed that the slider 75 of the master station control potentiometer 76 is moved upwardly along the slideware resistance 73 to a point spaced from the central dead spot. The potential of slider 75 is then changed from ground potential by an amount equal to the potential drop along resistance 73. This potential difference between slider 75 and ground causes a current to flow from slider 75 through conductor 84, slider 86, conductor 90, resistance 91 and 92 in parallel, and resistance 93 to ground at 29. A portion of this potential difference is impressed on the rudder control system, depending upon the position of slider 94 with respect to resistance 91. Similarly, a portion of the potential difference is impressed on the aileron control system 11, depending upon the position of slider 96 with respect to resistance 92. These control signal potentials introduced into the rudder and aileron control systems cause deflections of the rudder and aileron so as to turn and bank the aircraft, thereby changing its course.

In order to prevent the directional gyroscope 113 from performing its normal function and restoring the aircraft to its previous course, some means must be provided to take the directional gyroscope 113 out of control of the rudder and ailerons during a manually controlled turn of the aircraft. For this purpose we may use a brake mechanism schematically indicated at 121. The brake mechanism 121 is an electrically operated device, which when energized locks the rudder control potentiometer 111 and the aileron compensating potentiometer 120 against movement by the directional gyro 113. The directional gyroscope 113 drives the two potentiometers through a slip friction connection, not shown, so that when the potentiometers 111 and 120 are locked, the gyroscope 113 may change its position without undue stress.

The brake 121 is energized through an electrical circuit controlled by a switch 122. The switch 122 is operated by a cam 123, which is moved by the knob 77 so that the switch contacts are closed whenever the manual control potentiometer 76 is moved from its neutral position.

The switch 122 comprises three flexible switch blades 124, 125, and 126, each carrying a contact at one end and fixed at the opposite end, and arranged so that the contacts on both pairs of adjacent blades are moved into engagement upon movement of cam 123 away from its normal position. An energizing circuit for brake 121 may be traced from the upper terminal of a battery 127, through a conductor 128, switch blades 125 and 126, a conductor 130, brake 121, a conductor 131, and ground connections 132 and 133 to the lower terminal of battery 127.

The vertical gyroscope 116 is provided with a gravity responsive erecting device, schematically indicated at 134, which continuously tends to restore the axis of the gyroscope 116 to the true vertical. Such an erecting device is more completely described in the Gille application previously referred to. When the aircraft makes a turn, that part of the erecting device which is effective with regard to deviation from the vertical about the longitudinal axis of the aircraft must be made temporarily ineffective, in order that it shall not respond to the lateral accelerations of the aircraft and thereby tend to make the vertical gyro 116 assume a position where its axis is not truly vertical. The erecting device 134 may be provided with a suitable electrical mechanism for this purpose, as shown in the Gille application, for example, which mechanism may be energized through a circuit which may be traced from the upper terminal of battery 127 through conductor 128, switch blades 125 and 124, a conductor 135, the erecting device 134, and ground connections 136 and 133 to the lower terminal of battery 127.

It may be observed that when the slider 86 of transfer potentiometer 87 is in the position shown in the drawing, that any change in the position of slider 80 along resistance 74 is ineffective to introduce any potential difference into the rudder and aileron control systems. Since the slider 86 is directly connected to the slider 75, any movement of the slider 80 cannot change the potential of slider 86 to a value different from that determined by slider 75. Any potential introduced between slider 80 and ground by movement of slider 80 along resistance 74 appears as a potential drop across resistance 83, where it is ineffective in the rudder and aileron control systems.

The knob 88 which operates the transfer potentiometers 87 and 110 is provided with an index which moves between two legends "M" and "S" as the knob is moved from the position shown in the drawing, wherein the master control station 70 is in control to a position wherein the secondary control station is in control.

When the transfer slider 86 is moved to the right-hand end of resistance 83, the slider 86 is then directly connected to slider 80 through conductor 85, and the rudder and aileron control systems may then be controlled by manipulation of knob 82, and the consequent movement of slider 80 along resistance 74.

The knob 82 also operates a cam 140, which controls a switch 141 generally similar to the switch 122. The switch 141 comprises three flexible switch blades 142, 143, and 144, which control energizing circuits for the brake device 121 and the erecting device 134. These circuits are also controlled by a pair of switches 145 and 146 operated by a cam 147 which is moved with the transfer knob 88. When the knob 88 is turned so that its index is adjacent the legend "M" in the drawing, the cam 147 is in a position so that switches 145 and 146 are both open, and the switch 141 cannot then control the brake 121 and the erecting device 134. When the knob 88 is moved so that its index is adjacent the legend "S" in the drawing, the cam 147 closes both switches 145 and 146, placing the switch 141 in control of energizing circuits for brake 121 and erecting device 134.

This energizing circuit for brake 121 may be traced from the upper terminal of battery 127 through conductor 128, a conductor 150, switch blades 143 and 144, a conductor 151, switch 146, conductor 130, brake 121, conductor 131, and ground connections 132 and 133 to the lower terminal of battery 127.

The latter energizing circuit for the erecting device 134 may similarly be traced from the upper terminal of battery 127 through conductor 128, conductor 150, switch blades 143 and 142, a conductor 152, switch 145, a conductor 153, conductor 135, erecting device 134, and ground connections 136 and 133 to the lower terminal of battery 127.

When the slider 108 of the elevator transfer control potentiometer 110 is in the position shown in the drawing, the conductor 58 is directly connected through conductor 105 and slider 108 to ground at 61. Therefore any movement of slider 102 along resistance 101 is ineffective to introduce any potential between conductor 58 and ground, and is therefore ineffective to introduce any controlling potential into the elevator control system.

When the index on the knob 88 is moved from a point adjacent the legend "M" to a point adjacent the legend "S", the slider 108 is operated to the opposite end of resistance 106. Under those conditions, if slider 102 is moved away from the center position on resistance 101, a potential difference appears between slider 102 and the center taps on resistance 101, which potential is impressed across the resistance 106. Under those conditions, the resistance 106 is connected between conductor 58 and ground. This connection may be traced from conductor 58 through conductor 105 and resistance 106 to its lower terminal and thence through slider 108 to ground at 61. The elevator is then under the control of the operator at the secondary control station 71.

When the slider 108 is in the position shown in the drawing, the elevator is under the control of the operator at the master control station by means of the centering adjustment rheostats 160 and 161 in the main elevator control network 55, as described in the co-pending Gille application previously mentioned.

From the foregoing description, it should be apparent that when the knob 88 is at the position shown in the drawing, the control surfaces of the aircraft are normally under automatic control, but that control may be taken over by a person at the master control station 70 by manipulation of knob 77. Furthermore, at such a time, manipulation of either knob 82 or knob 104 at the secondary control station 71 has no effect upon the control surfaces of the aircraft. When the transfer knob 88 is in a position such that its index points to the legend "S" in the drawing, the aircraft is still normally under automatic control, but control may be taken over manually by manipulation of knobs 82 and 104. At such a time, the knob 77 is ineffective to cause any operation of the control surfaces of the aircraft.

It will be recognized that if the operator at the master control station chooses, he may slowly operate the knob 88 so as to gradually or modulatingly transfer control from his station to the secondary station. By setting the knob 88 in a central position where, for example, the two stations have equal controlling effects on the rudder and ailerons. When the knob 88 is in any other intermediate position, the relative control effects of the master and secondary control stations are proportioned in accordance with the particular position of knob 88.

While we have shown and described a preferred embodiment of our invention, other modifications thereof will be readily apparent to those skilled in the art, and therefore we wish our invention to be limited only by the appended claims.

We claim as our invention:

1. Control apparatus for an aircraft having a pilot's compartment and a compartment remotely located therefrom and having a rudder and ailerons, comprising in combination, motor means for driving said rudder, motor means for driving said ailerons, control means for said rudder motor means, control means for said aileron motor means, a first control device located in said pilot's compartment, a second control device located in said remotely located compartment, and means including either of said control devices for simultaneously introducing a control effect into both said control means whereby said rudder and ailerons are positioned so that the aircraft is banked as it turns.

2. Control apparatus for an aircraft having a pilot's compartment and a compartment remotely located therefrom and having a control surface affecting the longitudinal direction of flight of said aircraft, comprising in combination, electrical motor means for driving said control surface, means including a balanceable electrical network for controlling said motor means, a first variable impedance device located in said pilot's compartment, a second variable impedance device located in said remotely located compartment, a variable impedance in said network driven by said motor means, and means connecting said first and second impedance devices in said network so that variation of either impedance device controls the operation of said motor means.

3. Control apparatus for an aircraft having a pilot's compartment and a compartment remotely located therefrom and having a control surface affecting the direction of flight of the plane, comprising in combination, motor means for driving said control surface, control means for said motor means, a first manually operable control device controlled in said pilot's compartment, a second manually operable control device controlled in said remotely located compartment, means operatively connecting said control devices with said control means, and means in said pilot's compartment for modulatingly proportioning the control of said control means between said control devices.

4. In apparatus for controlling the direction of flight of an aircraft having a master station and a station remotely located therefrom and having a first airfoil surface controlling the longitudinal direction of flight and a second airfoil surface controlling the ascent and descent of said aircraft, comprising in combination, first motor means for driving said first airfoil surface, second motor means for driving said second airfoil surface, first and second manually operable control devices located at said master station, third and fourth manually operable control devices located at said remote station, control means for said first motor means including said first and third control devices, control means for said second motor means including said second and fourth control devices, a first transfer means for selectively varying the relative effects of said first and third control devices, a second transfer means for selectively varying the relative effect of said second and fourth control devices, and a single actuator for simultaneously positioning both of said transfer means.

5. In apparatus for controlling the direction of flight of an aircraft having a master station and a station remotely located therefrom and having a first airfoil surface controlling the longitudinal direction of flight and a second airfoil surface controlling the ascent and descent of said aircraft, comprising in combination, first motor means for driving said first airfoil surface, second motor means for driving said second airfoil surface, first and second manually operable control devices located at said master station, third and fourth manually operable control devices located at said remote station, control means for said first motor means including said first and third control devices, control means for said second motor means including said second and fourth control devices, a first transfer means for selectively varying the relative effects of said first and third control devices, a second transfer means for selectively varying the relative effect of said second and fourth control devices, and a single manual actuator located at said master station for positioning both of said transfer means.

6. In apparatus for controlling the direction of flight of an aircraft having a master station and a station remotely located therefrom and having a first airfoil surface controlling the longitudinal direction of flight and a second airfoil surface controlling the ascent and descent of said aircraft, comprising in combination, first motor means for driving said first airfoil surface, second motor means for driving said second airfoil surface, control means for said first motor means including a directional gyroscope having a brake associated therewith, control means for said second motor means including a vertical gyroscope having automatic erection means associated therewith, a first manually operable control device located at said master station, a second manually operable control device located at said remote station, said control means for said first motor means including said first control device, said control means for said second motor means including said second control device, a transfer means for selectively varying the relative effects of said first and second control devices, a manual actuator for positioning said transfer means, means associated with each of said first and second control devices for controlling said brake of said directional gyroscope and said erecting means of said vertical gyroscope, and means actuated by said manual actuator when the same is moved to a position in which said first control device has primary control of the control means for said first motor means to render ineffective the brake and erecting means control of said second control device.

7. In apparatus for controlling the direction of flight of an aircraft having a master station and a station remotely located therefrom and having a first airfoil surface controlling the longitudinal direction of flight and a second airfoil surface controlling the ascent and descent of said aircraft, comprising in combination, first motor means for driving said first airfoil surface, second motor means for driving said second airfoil surface, control means for said first motor means including a directional gyroscope having a brake associated therewith, control means for said second motor means including a vertical gyroscope having automatic erection means associated therewith, first and second manually operable control devices located at said master station, third and fourth manually operable control devices located at said remote station, said control means for said first motor means including said first and third control devices, said control means for said second motor means including said second and fourth control devices, a first transfer means for selectively varying the relative effects of said first and third control devices, a second transfer means for selectively varying the relative effect of said second and fourth control devices, a single manual actuator for positioning both of said transfer means, means associated with each of said first and third control devices for controlling said brake of said directional gyroscope and said erecting means of said vertical gyroscope, and means actuated by said manual actuator when the same is moved to a position in which said first control device has primary control of the control means for said first motor means to render ineffective the brake and erecting means control of said third control device.

8. Control apparatus for an aircraft having a pilot's compartment and a compartment remotely located therefrom and having means for turning said aircraft about a vertical axis and means for turning said aircraft about its roll axis, comprising in combination, motor means for driving said first means, motor means for driving said second means, control means for said first motor means, control means for said second motor means, a first control device located in said pilot's compartment, a second control device located in said remotely located compartment, and means including both of said control devices for introducing a control effect into both control means whereby both said turning means are positioned so that the aircraft is banked as it turns.

9. Control apparatus for an aircraft having a pilot's compartment and a compartment remotely located therefrom and having rudder and ailerons, comprising in combination, motor means for driving said rudder, motor means for driving said ailerons, control means for said rudder motor means, control means for said aileron motor means, a first control device including a variable impedance means in said pilot's compartment, a second control device including a variable impedance means in said remote compartment, means responsive to either control device and connected to both control means whereby either control device may introduce a control effect into both control means so that the aircraft is banked as it turns.

10. Control apparatus for an aircraft having a pilot's compartment and a compartment remotely located therefrom and having a rudder and ailerons, comprising in combination, electric motor means for driving said rudder, electric motor means for driving said ailerons, a control means for each electric motor means, a variable voltage system for each control means, said control means being responsive to the difference of potential between two points in the variable voltage system, a first variable voltage source in said pilot's compartment, a second variable voltage source in said remote compartment, means for applying a variable voltage from either device to both systems whereby the aircraft is banked as it turns.

11. Control apparatus for an aircraft having a rudder and aileron control surfaces, motor means for driving said rudder, motor means for driving said ailerons, an electrical network means for controlling each motor means, a variable impedance device common to both networks for controlling both motor means, a first control device in a pilot's compartment for affecting the value of the variable impedance, a second control device in a compartment remotely located from said pilot's compartment for affecting the value of the variable impedance whereby operation of either control device causes the operation of the rudder and the aileron so that the aircraft is banked while turning.

12. Control apparatus for an aircraft having a pilot's compartment and a compartment remotely located therefrom and having a rudder and an aileron control surface, comprising in combination, motor means for driving said rudder, motor means for driving said aileron, control means for said rudder motor means, control means for said aileron motor means, a first control device located in said pilot's compartment, a second control device located in said remote compartment, means including either control device for simultaneously introducing a control effect into both control means, and means in said pilot's compartment for placing one of said control devices in control of said control means.

13. Control apparatus for an aircraft having a pilot's compartment and a remotely located compartment and having a control surface comprising in combination, motor means for driving said control surface, control means for said motor means, a first control device in said pilot's compartment including a source of variable voltage, a second control device in said remote compartment including a source of variable voltage, means for connecting said variable voltages in series and means associating said connecting means with said control means whereby said control means may be controlled by each device.

14. Control apparatus for an aircraft having a pilot's compartment and a compartment remotely located therefrom and having a control surface comprising in combination, motor means for driving said control surface, control means for said motor means, a first control device in said pilot's compartment including a variable impedance, a second control device in said remote compartment including a variable impedance, means forming a circuit with both devices and jointly affected by said variable impedances, connections from said jointly affected circuit means to said control means and means for proportioning the effect of each device on said connections whereby said control means may be controlled by each device.

15. Control apparatus for an aircraft having rudder and aileron control surfaces for positioning the craft about the turn and roll axes, said apparatus comprising: motor means for operating said rudder; motor means for operating said aileron; means including an electrical network for controlling each motor means; a manually variable turn control electrical voltage signal producing device; a pair of voltage apportioning adjustable means connected electrically in parallel across said variable signal producing device; connections from one adjusting means to one network; and connections from the other adjusting means to the other network whereby the signal from said variable signal device may be apportioned in each network to coordinate the relative displacement of the rudder and ailerons.

16. Control apparatus for an aircraft having motor means for controlling the position of said craft about the turn axis and motor means for controlling the position of said craft about the roll axis, said apparatus comprising: a control means including a balanceable electrical network for said turn axis motor means; a control means including a balanceable electrical network for said roll axis motor means; a turn control device for providing a voltage signal in proportion to its adjustment; means for proportioning the voltage from said signal device applied to each network for unbalancing the same and effecting operation of each motor means; and means for electrically rebalancing each network and driven by its respective motor means, whereby the ratio of the movements of said motor means may be varied by said proportioning means to produce a coordinated turn of said aircraft.

17. Control apparatus for a dirigible craft having a pilot's position and a co-pilot's position remote from said pilot's position and having a control surface affecting the direction of flight of said craft, comprising in combination: motor means for driving said control surface; control means for said motor means including an electrical signal responsive device for operating said motor means in accordance with the signal applied to said responsive device; a pilot operated variable electrical signal source; a co-pilot operated variable electrical signal source; means operatively connecting said signal sources with the electrical signal responsive device of said control means; and means in said connecting means for modulatingly proportioning the control of said control means between said sources.

18. Control apparatus for an aircraft having motor means for controlling its position about the turn axis and motor means for controlling its position about the roll axis; said apparatus comprising: a control means including an electrical network for said turn axis motor means; a control means including an electrical network for said roll axis motor means, each network comprising signal generating and combining means; a control device comprising a variable signal generator; means for connecting said variable signal generator with each control means, said connecting means including means for proportioning the amount of signal to be introduced in each control means from said signal generator to adjust the relative operations of said turn and roll axes motor means; and craft roll responsive means for operating a generating means in each network.

ROBERT J. KUTZLER.
THEODORE J. WILSON.

REFERENCES CITED

The following references are of record in the file of this patent:

UNITED STATES PATENTS

| Number | Name | Date |
|---|---|---|
| 890,458 | Schley | June 9, 1908 |
| 1,706,968 | Schleicher et al. | Mar. 26, 1929 |
| 1,919,191 | Bates | July 25, 1933 |
| 1,946,693 | Hodgman | Feb. 13, 1934 |
| 2,135,991 | Nessell | Nov. 8, 1938 |
| 2,137,974 | Fischel | Nov. 22, 1938 |
| 2,190,390 | Thiry | Feb. 13, 1940 |
| 2,232,077 | Rosecky | Feb. 18, 1941 |
| 2,232,982 | Tank | Feb. 25, 1941 |
| 2,256,875 | Wade | Sept. 23, 1941 |
| 2,257,471 | McGrath | Sept. 30, 1941 |
| 2,266,064 | Muller | Dec. 16, 1941 |
| 2,283,754 | Matthews | May 19, 1942 |
| 2,307,941 | Meredith | Jan. 12, 1943 |
| 2,325,108 | Carlson | July 27, 1943 |